United States Patent
Schlösser et al.

(10) Patent No.: US 7,332,121 B2
(45) Date of Patent: Feb. 19, 2008

(54) THERMOFORMING APPARATUS FOR PRODUCING SHAPED BODIES OF PLASTIC SHEET, AND A METHOD FOR PRODUCING THEM

(75) Inventors: Helmut Schlösser, Wachtberg (DE); Peter Asselborn, Bergisch Gladbach (DE)

(73) Assignee: Kuhne Anlagenbau GmbH, St. Augustin (DE)

( * ) Notice: Subject to any disclaimer, the term of this patent is extended or adjusted under 35 U.S.C. 154(b) by 159 days.

(21) Appl. No.: 10/512,258

(22) PCT Filed: Apr. 17, 2003

(86) PCT No.: PCT/EP03/04028

§ 371 (c)(1),
(2), (4) Date: Jun. 17, 2005

(87) PCT Pub. No.: WO03/091001

PCT Pub. Date: Nov. 6, 2003

(65) Prior Publication Data
US 2005/0244534 A1    Nov. 3, 2005

(30) Foreign Application Priority Data

| Apr. 25, 2002 | (DE) | ............................ 102 18 486 |
| Apr. 25, 2002 | (DE) | ............................ 102 18 511 |
| Apr. 25, 2002 | (DE) | ......................... 202 06 600 U |
| Apr. 25, 2002 | (DE) | ......................... 202 06 601 U |

(51) Int. Cl.
*B29C 51/04* (2006.01)
*B29C 51/38* (2006.01)

(52) U.S. Cl. ..................... 264/550; 425/398

(58) Field of Classification Search ............ 425/387.1, 425/388, 398; 264/550
See application file for complete search history.

(56) References Cited

U.S. PATENT DOCUMENTS 2,282,423 A    5/1942   Kopitke (Continued)

FOREIGN PATENT DOCUMENTS

DE         2146217         3/1973

(Continued)

*Primary Examiner*—Robert B. Davis
(74) *Attorney, Agent, or Firm*—The Nath Law Group; Jerald L. Meyer; Stanley N. Protigal (57) ABSTRACT

The present invention relates to a thermoforming apparatus (1) for producing shaped bodies of plastic sheet (50), such as cups, containers, lids, secondary packagings for foodstuffs or the like, which comprises a forming station with a two-part forming tool (20). The two-part forming tool (20) comprises an upper tool table (28) adapted to be adjustably fixed and having an upper tool (30) with pre-stretch means (92) movably mounted therein, and a movable lower tool table (32) having a lower tool (34) with cavities. The movable lower tool table (32) is guided through the intermediary of guide means (42) and capable of being approached to the upper tool table (28) and moved away from it. In accordance with the invention, the upper tool table (28) for the first time includes associated drive means (26) for adjusting the upper tool table (28) in its position relative to the upper dead point of the lower tool table (32) in correspondence with the respective shaped body to be produced. Moreover the upper tool table (28) for the first time includes associated second drive means (88) for driving the pre-stretch means (92) movably mounted in the upper tool (30). Furthermore the present invention relates to a method for manufacturing the shaped bodies of plastic sheet (50).

11 Claims, 10 Drawing Sheets

U.S. PATENT DOCUMENTS

| | | |
|---|---|---|
| 4,105,736 A | 8/1978 | Padovani |
| 4,140,457 A * | 2/1979 | Miki et al. ................. 425/398 |
| 4,565,513 A | 1/1986 | Kiefer |
| 5,002,479 A * | 3/1991 | Brown et al. ............... 425/398 |
| 6,135,756 A | 10/2000 | Arends |
| 6,200,122 B1 | 3/2001 | Chun et al. |

FOREIGN PATENT DOCUMENTS

| | | | |
|---|---|---|---|
| DE | 197 16 655 A1 | 10/1998 | |
| DE | 199 48 768 C1 | 3/2001 | |
| EP | 0 884 161 A2 | 12/1998 | |
| EP | 1 046 489 A2 | 10/2000 | |
| EP | 1 142 691 A2 | 10/2001 | |
| JP | 60115419 A | 6/1985 | |
| JP | 04001015 A | 1/1992 | |

* cited by examiner

THERMOFORMING APPARATUS FOR PRODUCING SHAPED BODIES OF PLASTIC SHEET, AND A METHOD FOR PRODUCING THEM

The present invention relates to a thermoforming apparatus for producing shaped bodies of plastic sheet, such as cups, containers, lids, food packagings or the like, comprising a forming station with a two-part forming tool, in accordance with the preamble of claim 1, as well as a method for producing such shaped bodies in accordance with the preamble of claim 7.

Thermoforming apparatus have in practice become known in different variants and embodiments. For manufacturing container-type articles or shaped bodies of thermoplastic material, a two-part forming tool is used. One forming tool half, the so-called upper tool, is attached to the upper tool table and generally connected, together with the latter, with the frame or stand of the thermoforming apparatus in an adjustably fixed manner, so that the upper tool may be adjusted to the respective shaped body to be produced. The other forming tool half, the so-called lower tool, is movably guided in the frame or stand of the thermoforming apparatus.

In order to form the shaped bodies, the forming tool halves, i.e., the upper and lower tools, are arranged in a mutually facing, closed position. Between the upper and lower tools a plastic sheet is arranged which is usually pre-heated and thus has good ductility, and which is mostly supplied intermittently from a supply reel in the form of a sheet web.

During the deep-drawing step, the plastic sheet is clamped between the upper and lower tools and thus immobilized. Then the plastic sheet is pressed into the cavities of the lower tool by the pre-stretch means of the upper tool, while the rim of the shaped body to be produced continues to be clampingly retained between the upper and lower tools. By generating a vacuum in the cavities, or by injection of air, the sheet applies itself against the inner walls of the cavities in the lower tool and thereby assumes the desired shape.

After sufficient cooling of the plastic sheet through contact with the tool surface, which may optionally be cooled actively, the shaped bodies are severed from the plastic sheet. To this end, the lower tool is moved upwards by about the amount of the sheet thickness. Corresponding cutting edges of the two-part forming tool cut the individual shaped bodies from the sheet web. The remaining sheet matrix is, in turn, usually supplied intermittently to a reeling unit.

In order to remove the shaped bodies from the cavities, the lower tool is subsequently moved away from the upper tool while being rotated about its longitudinal axis such that the lower tool faces a stacking means, and the shaped bodies may thus be transferred to the stacking means.

Examples for the above discussed thermoforming apparatus as known from practice are described, e.g., in U.S. Pat. No. 6,135,756 or DE 33 46 628 A1.

These known thermoforming apparatus do, however, have the essential economical drawback of only low cycle frequencies in the order, e.g., of up to 30 cycles per minute being achievable. Higher cycle frequencies are not possible without damage to the moved components. These low cycle frequencies are, however, not acceptable any more in view of the cost pressure nowadays prevailing.

Another drawback are the drive mechanisms for the pre-stretch means movably arranged in the upper tool as employed in the known thermoforming apparatus, as with these it is also only possible to realize low cycle frequencies of, e.g., up to about 30 cycles per minute. Furthermore in the known thermoforming apparatus the lack of accuracy in positional adjustment or adaptability of the upper tool in relation to the shaped bodies to be produced is a disadvantage.

The thermoforming apparatus described in DE 33 46 628 A1 specifically operates with a two-part forming tool, with the upper tool being fixedly attached to the stand, and the lower tool being movable. For opening and closing, the lower tool is aligned towards the upper tool and away from it and at the same time towards a stacking means, and oriented away from the latter back to the upper tool in a combined lifting and rotating movement. The lifting and rotating movement of the lower tool is produced by a cam disc/toggle joint drive. Hereby the lower tool is to be displaced vertically and at the same time rotated about its own longitudinal axis.

The combination of a toggle joint mechanism in conjunction with a cam disc drive employed in the thermoforming apparatus known from DE 33 46 628 A1 has a very complex configuration. Even the cam disc drive mechanism itself already exhibits the inherent drawback that it is only capable of transmitting limited forces. In addition, high cycle frequencies cannot be achieved with a cam disc drive mechanism. Cam disc drive mechanisms furthermore tend to wear rapidly, so that they have to be maintenanced frequently, which raises the operating costs of such a thermoforming apparatus in an unacceptable degree. Moreover the presently discussed thermoforming apparatus in accordance with DE 33 46 628 A1 and its complex toggle joint mechanism includes another group of components which inherently also only allows for low cycle frequencies.

More detailed information on the design of the drive mechanism of the pre-stretch means is not provided in DE 33 46 628 A1. Accordingly it must be assumed that the pre-stretch means drive mechanism, which is not discussed in more detail, does not allow for any higher cycle frequencies than the drive mechanism for the lower tool, the cycle frequency of which was already found to be too low in the foregoing.

The thermoforming apparatus in accordance with U.S. Pat. No. 6,135,756 specifically also comprises a two-part forming tool. The guide means is here, as well, combined with the drive means of the lower tool table, or lower tool, and generates a combined lifting and rotating movement of the lower tool through the intermediary of a cam disc crank drive, with two cam disc crank drives being arranged on respective outer end faces of the lower tool. The lower tool has at its outer sides three journals each, which move in the associated grooved cams on the stand. These grooved cams have an extremely complex geometry and are adapted such that during opening of the forming tool, the lower tool may be moved downwardly away from the upper tool and rotated in order to be able to orient it towards a stacking means and again rotate it away from the latter. Inasmuch as the complex geometry of the grooved cams is not suited for transmitting the forces necessary for trimming the finished shaped bodies from the plastic sheet, additional cam discs are provided for transmitting the respective necessary forces. The trimming process thereby achievable nevertheless as before takes place by cutting or squeezing off. This may not be referred to as die-cutting.

Apart from this, the high cycle frequencies nowadays demanded are impossible with the geometrically complex grooved disc guide tracks that may only be adapted to each other with great difficulty.

The drive mechanism for the pre-stretch means in U.S. Pat. No. 6,135,756 is described as a combination of rack and gear. Hereby it is not possible to realize the high cycle frequencies demanded for an economical operation of a present-day thermoforming apparatus. Namely, not only high cycle frequencies in closing and opening the forming tool are required for lastingly achieving a repeatable cycle frequency, but the lifting movement of the pre-stretch means must in parallel be increased in at least a same degree in order to operate the pre-stretch means in a same cycle as the forming tool.

Furthermore, pre-stretch means drive mechanisms are known in practical use where the pre-stretch means are driven through the intermediary of spherical roller spindles. With such spherical roller spindles, the demanded high cycle frequencies can not be attained. In addition, spherical roller spindles are too expensive, require frequent maintenance, and have long down times as a further drawback.

Accordingly it is the object of the present invention to improve known thermoforming apparatus in such a way that substantially higher cycle frequencies may be achieved, and an economical operation of thermoforming apparatus thus improved becomes possible. Moreover it is an object of the present invention to propose an economical method for producing shaped bodies of plastic sheet.

What is proposed in accordance with the invention is a thermoforming apparatus for producing shaped bodies of plastic sheet, such as cups, containers, lids, food packagings or the like, comprising a forming station with a two-part forming tool. The two-part forming tool comprises an upper tool table adapted to be adjustably fixed and having an upper tool with pre-stretch means movably mounted therein, and a movable lower tool table having a lower tool with cavities. The movable lower tool table is guided through the intermediary of guide means and capable of being approached to the upper tool table and moved away from it by drive means.

Here it is provided for the first time that the upper tool table includes associated first drive means for adjusting the upper tool table in its position relative to the upper dead center of the lower tool table in correspondence with the respective shaped body to be produced, and that the upper tool table includes associated second drive means for driving the pre-stretch means movably mounted in the upper tool.

In contrast with the pre-stretch means drive mechanisms known from the prior art, uncoupling the drive mechanism of the pre-stretch means in accordance with the invention by correspondingly providing separate drive means therefor as well as further separate drive means for adjusting or setting the upper tool in accordance with the shaped bodies to be produced prior to finally immobilizing it before the start of the respective production process, provides the advantage that these two drive mechanisms may be optimized independently of each other. Accordingly, it is possible to provide a drive mechanism optimally suited for once adjusting or setting the upper tool prior to starting the respective production process, which drive mechanism then will advantageously not inevitably have to furthermore realize the demanded high cycle frequencies in driving the pre-stretch means, but may be selected particularly with a view to accuracy and repeatability of a precise adjustment of the upper tool table. Accordingly, the separate pre-stretch means drive mechanism may be selected with a view to the demanded high cycle frequency and optimized in this respect.

Such separate optimization of the separate drive mechanisms does appear to increase the number of components, but on the other hand provides the inestimable advantage that either drive mechanism may be given an extremely simple construction and thus may in the long run have a cost-efficient design.

In a preferred embodiment of the thermoforming apparatus in accordance with the invention, the first drive means for adjusting the upper tool table have the form of an electrical servomotor. This provides the advantageous possibility of accurate regulation, wherein its speed profile may be selected freely. Hereby it is possible to achieve both fast delivery movements for overcoming long adjusting distances, as well as particularly slow and accurate delivery movements for accurately setting the upper tool table in the millimeter or even tenth-of-millimeter range, depending on the desired precision. Low-cost electrical servomotors are moreover commercially available in any demanded design variant.

In accordance with a further preferred embodiment of the thermoforming apparatus in accordance with the invention, it is provided that these first drive means cooperate via a synchronization shaft with e.g., worm gears/gears arranged thereon with two associated actuating spindles which, in turn, act on the upper tool table such that the latter may be moved up and down in its horizontal orientation, so that the upper tool table may be adjusted to the respective shaped body to be produced. Thus advantageously the above discussed advantage of a freely selectable speed profile of an advantageous servomotor may in a synergetic manner optimally be converted both into large delivery movements and small or fine adjustment movements.

In a further preferred variant of the thermoforming apparatus in accordance with the invention, the second drive means of the upper tool table include a hydraulic drive mechanism or a crank drive driven through the intermediary of an electric servomotor for driving the pre-stretch means. In either case, particularly high cycle frequencies may be achieved. These high cycle frequencies may be at least 40 cycles, 50 cycles or more cycles. Thus with a hydraulic drive mechanism of the pre-stretch means it is moreover advantageously possible to achieve pre-stretch means forces of at least 40 kN with a work stroke of at least 120 mm and a moved mass of at least 200 kg, with the time for covering the work stroke of 120 mm being less than 200 ms.

In accordance with a further preferred variant of the second drive means, the latter acts on the pre-stretch means in the upper tool via a thrust bar, a rocking lever, and a forcing lever, which represents a particularly simple constructive solution. In a particularly preferred manner it is here provided for the rocking lever to have a shiftably designed fulcrum, so that its lever arms, and accordingly its force relations, may be adapted to the respective application. Actuation of the pre-stretch means via a thrust bar, a rocking lever, and a forcing lever permits to position the second drive mechanisms externally of the range of the upper tool, in a particularly advantageous manner not directly above it, so that when a hydraulic drive mechanism is employed, a slight leakage of hydraulic oil—which may not always be excluded completely—is not particularly significant as it advantageously can not drip down onto the sheet web. If, moreover, the driving forces of the second drive mechanism for the pre-stretch means are advantageously transmitted to the pre-stretch means via a thrust bar, a rocking lever and a forcing lever, then this second drive mechanism may be arranged laterally from the upper tool table such that the second drive mechanism is moved jointly with the upper tool table and thus not moved relative to the latter, so that the second drive mechanism exclusively controls the movement of the pre-stretch means and thus may be optimized particularly advantageously with regard to high cycle frequencies.

It is a further advantage that shifting the fulcrum may be utilized for adjusting a variable stroke of the pre-stretch means. Shifting the fulcrum advantageously results in a constant stroke of the drive mechanism and a continuous adaptation of the stroke of the pre-stretch means, so that the upper dead center of the pre-stretch means remains constant, and the bottom dead center may be adapted as a function of the height of a product or shaped body.

In a further preferred variant of the thermoforming apparatus in accordance with the invention, the pre-stretch means may be driven through the intermediary of the second drive means such that a stroke of at least 120 mm or more may be performed in less than 300 ms, preferably less than 200 ms. Cycle frequencies of more than 60 cycles per minute may thus advantageously be realized, so that with a thermoforming apparatus in accordance with the invention providing, e.g., a crank drive for a linearly guided lower tool table, it is altogether possible to achieve high cycle frequencies that had hitherto been thought to be unattainable.

The above object is attained through the features of Claim 7 in terms of method. What is performed here for the first time is a method for producing shaped bodies of plastic sheet, such as cups, containers, lids, secondary packagings for foodstuffs or the like, with a thermoforming apparatus in accordance with the preamble of Claim 1, which method comprises the following steps: a) closing the forming tool by guiding the movable lower tool table through the intermediary of the guide means and driving it through the intermediary of the drive means such that it is approached towards the upper tool table, b) producing the shaped bodies in the closed condition of the forming tool, c) opening the forming tool by guiding the movable lower tool table through the intermediary of the guide means and driving it through the intermediary of the drive means such that it is moved away from the upper tool table, and d) ejecting the shaped bodies, optionally into a stacking means, where it is provided for the first time that the upper tool table is adjusted through the intermediary of associated first drive means in its position relative to the upper dead center of the lower tool table in correspondence with the respective shaped body to be produced, and that the pre-stretch means movably mounted in the upper tool may be driven through the intermediary of second drive means. The advantages connected with this have already been discussed in the foregoing with regard to the apparatus. Further advantageous embodiments of the method are discussed in the subclaims.

The invention shall in the following be explained in more detail by way of embodiments while referring to the figures of the drawing, wherein.

Figure 1:
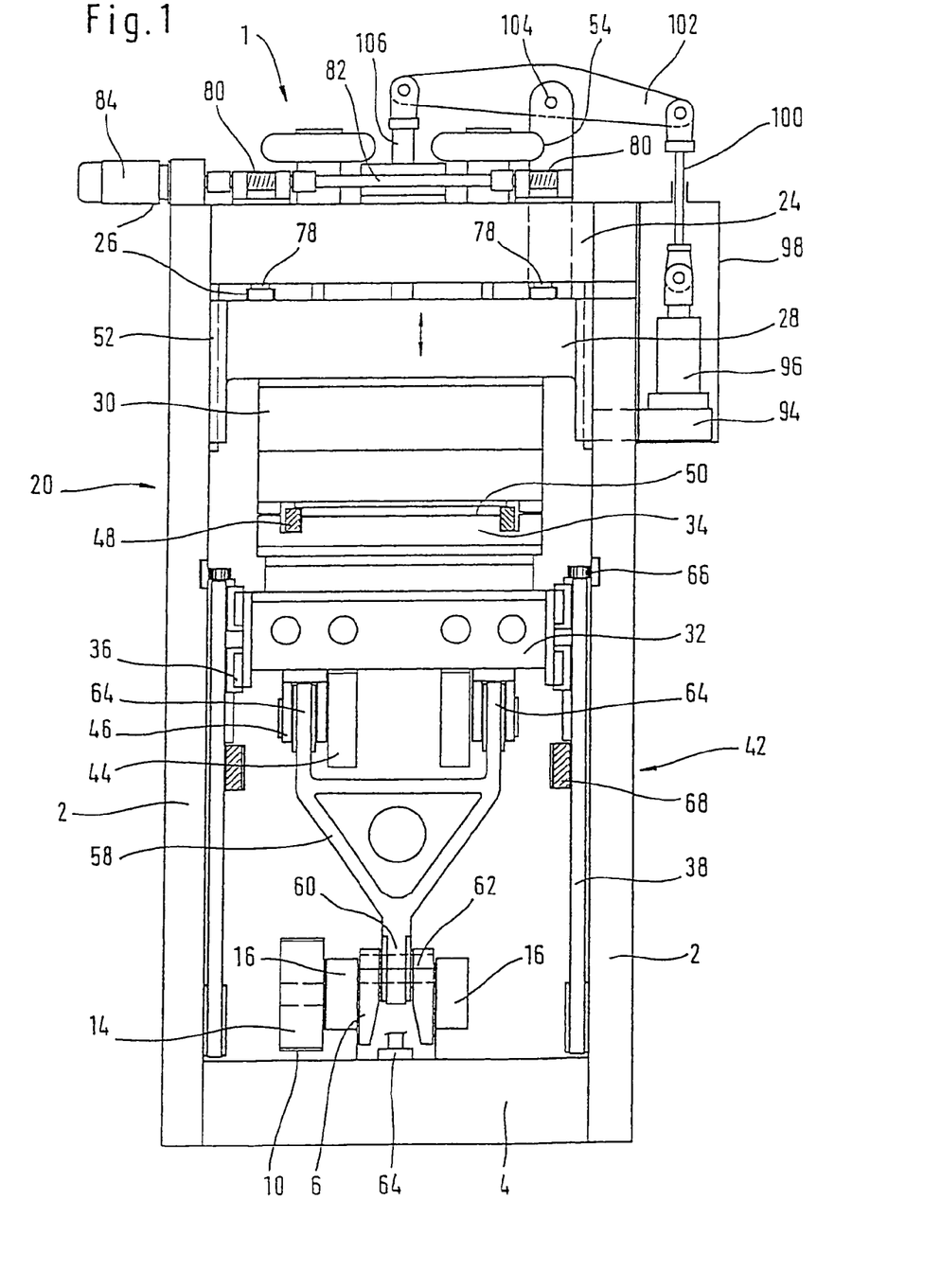
FIG. 1 a top view of an embodiment of a thermoforming apparatus in accordance with the invention.

FIG. 1 represents an exemplary embodiment of a thermoforming apparatus 1 in accordance with the invention in a front view. The movable component groups of the thermoforming apparatus 1 are arranged in a stand 2. The stand 2 may, for instance, be constructed in the form of stand panels of steel sheet which are stress-relieved by annealing. A cross-member 4 arranged underneath, i.e., near the ground, connects the stand panels 2 and at the same time serves as a bed for the bearings of the crankshaft drive mechanism 6. The crankshaft drive mechanism 6 is in the presently represented variant driven by an electric servomotor 8. Its drive force is transmitted via a belt 10 and pulleys 12 and 14, which is more clearly visible particularly in the side view of FIG. 2. In the presently represented variant, the crankshaft drive mechanism 6 is mounted symmetrically on both sides in relatively short lever arms 16, with the lever arms 16 in turn being linked to a bracket 18 mounted on the cross-member 4.

Figure 2:
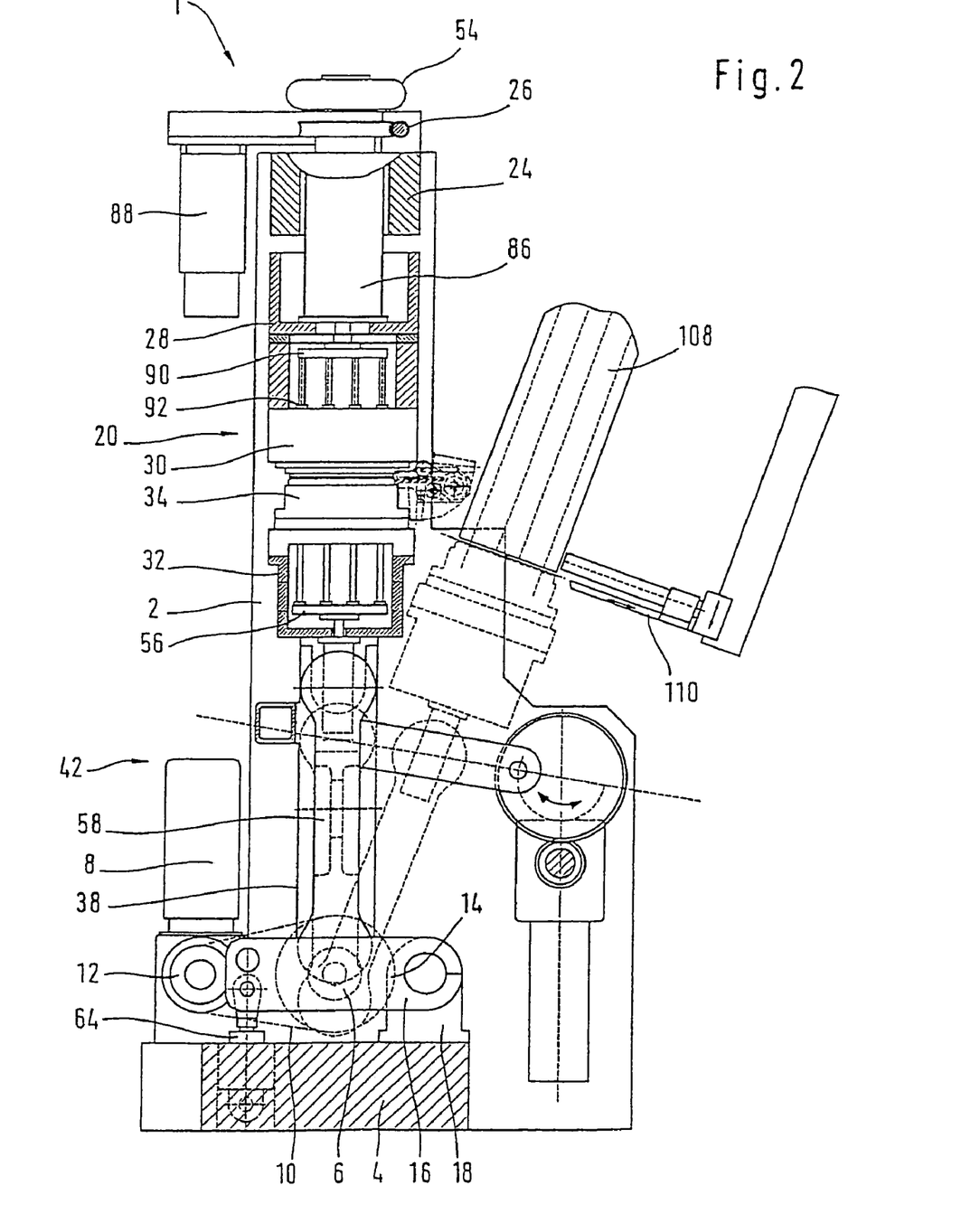
FIG. 2 is a side view of the exemplary embodiment of a thermoforming apparatus in accordance with the invention as represented in FIG. 1.

Both in FIG. 1 and in FIG. 2, the two-part forming tool 20 of the forming station of the thermoforming apparatus 1 is represented in the closed condition approximately in the center of the drawing. A cross-member 24 visible in the upper section of FIG. 1 and FIG. 2 connects the two stand panels 2 above the two-part forming tool 20 and serves as a base for a drive mechanism 26 for adjusting the position of the upper tool table 28 with the upper tool 30 attached thereto. The drive mechanism 26 for adjusting the position of the upper tool table 28 may, e.g., have the form of a precision lifting mechanism with backlash compensation. A lower tool table 32 supports the lower tool 34 and is arranged between the rotatable guide rails 38 of the rotatable guide rail assembly 40 (cf. FIGS. 3 and 4) of the guide means 42 through the intermediary of correspondingly designed linear guides 36. At the underside or bottom of the lower tool table 32, ejector cylinders 44 and the upper connecting rod bearings 46 are attached.

Between the upper tool 30 and the lower tool 34 of the forming tool 20 represented in the closed condition in FIGS. 1 and 2, a chain transport means 48 is shown whereby the plastic sheet 50 is supplied to the two-part forming tool 20 and transported off following forming and trimming out of the shaped bodies that are not shown here any more, with the plastic sheet 50 being tensioned by correspondingly suitable means in the range of the two-part forming tool 20, preferably bidirectionally.

The upper tool table 28 is guided in correspondingly designed linear guides 52 between the stand panels 2. The lower tool 34 may, e.g., have a mounting surface of 490 mm×1040 mm. Thus, e.g., four rows of eight cavities each for 32 shaped bodies may be realized at a diameter of the shaped bodies of about 75 mm. This amounts to a total die-cutting length of all edges to be severed of 7640 mm, necessitating a total die-cutting force of about 400 kN.

The upper tool 30 is fastened to the upper tool table 28, for example with the aid of spacers (not shown). Guide rails (not shown) facilitate mounting of the tools. A backlash compensation 54 serves for compensating play, e.g., during precision lifting 26 of the upper tool table 28. The linear guides 36 for the lower tool table 32 have a play-free adjustment and ensure accurate guiding of the lower tool 34. The linear guides 52 of the upper tool table 28 include slideways (not shown) which may be adjusted without play.

The ejector drive means 44, positioned underneath the lower tool table 32, for the ejectors 56 visible in FIG. 2 in a fragmentary sectional view, include two pneumatic cylinders with stroke-arresting means.

The connecting rod 58 driven by the crankshaft drive mechanism 6, which may also be referred to as a driving rod for driving the lifting stroke of the lower tool table 32, has the form of a triangle or of a Y in the presently represented variant. The connecting rod 58 is linked to the eccentric shaft portion 62 of the crankshaft drive mechanism 6 through a first connecting rod portion 60. The two upwardly directed arms 64 of the Y-shaped connecting rod 58 in the views of FIGS. 1 and 2 are linked to the connecting rod bearings 46 of the lower tool table 32. These two upper connecting rod bearings 46 here have an arrangement, if possible, where a flexure of the lower tool table 32 as well as its proper weight may be kept as low as possible. The Y-shaped connecting rod 58 advantageously has only one bearing at the lower connecting rod portion 60 of the presently represented variant, so that even one crank drive mechanism is sufficient.

As was already explained in the foregoing, the crankshaft drive mechanism 6 is mounted in two locations so as to better resist flexure. The respective crank bearings may be split for the purpose of easier mounting. The crankshaft drive mechanism 6 is centrally mounted in lever arms 16 forming a kind of double rocker. The latter in turn is mounted on the cross-member 4 by its right side through the intermediary of the bracket 18. On the left side of this double rocker, the die-cutting drive mechanism 64 attacks. The die-cutting drive mechanism 64 consists, e.g., of a hydraulic cylinder and an associated hydraulic system for generating with the aid of the hydraulic cylinder an abrupt cutting stroke that is transmitted via the double rocker 16, the crankshaft drive mechanism 6, the connecting rod 58, and the bearings 46 to the lower tool table 32 and thus to the lower tool 34.

The drive mechanism of the crankshaft drive mechanism 6 may—as was already mentioned above—include as the lifting drive mechanism a servomotor 8 which acts on the crankshaft drive mechanism 6 via transmission, toothed belt, ladder chain drive, or the like with little play. Closing and opening of the two-part forming tool 20 then correspond to respective 160-degree rotations at the crank shaft.

Figure 3:
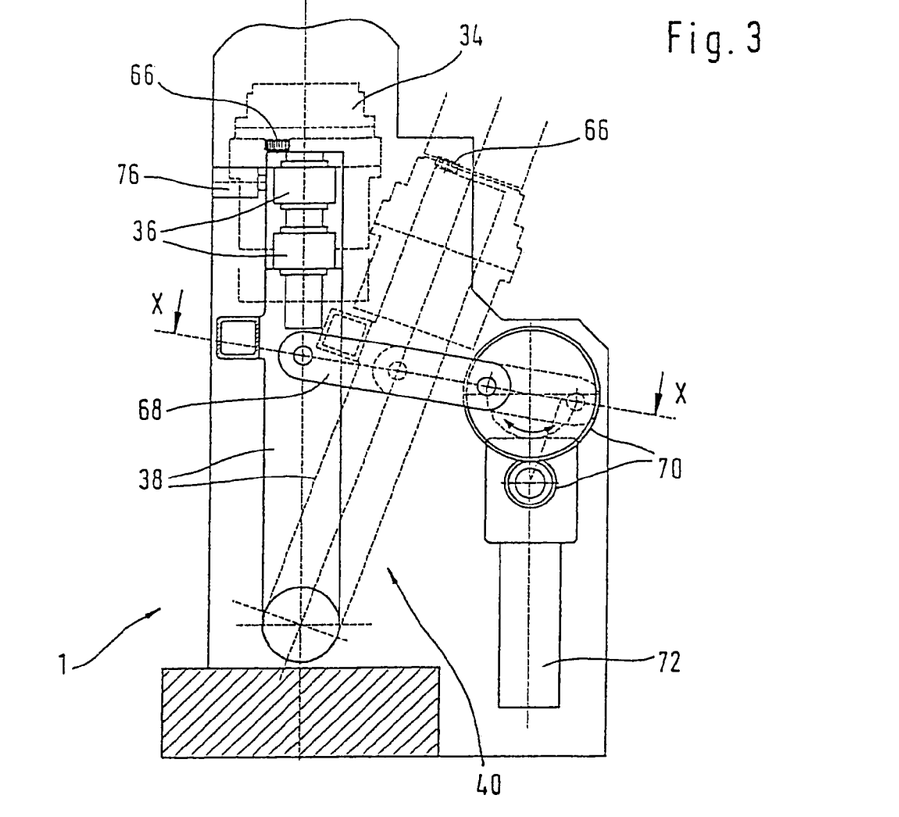
FIG. 3 is a laterally viewed detail of the drive mechanism for rotating the guide rail assembly of the variant of a thermoforming apparatus in accordance with the invention as shown in FIGS. 1 and 2.
Figure 4:
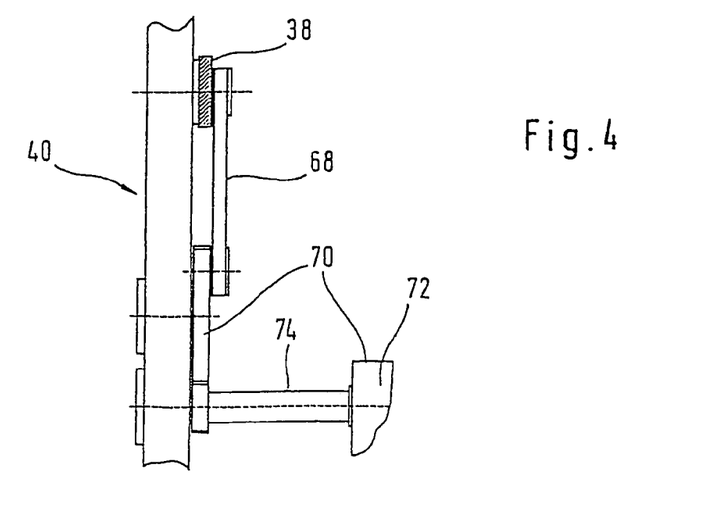
FIG. 4 a sectional view along line X-X of FIG. 3.
Figure 5:
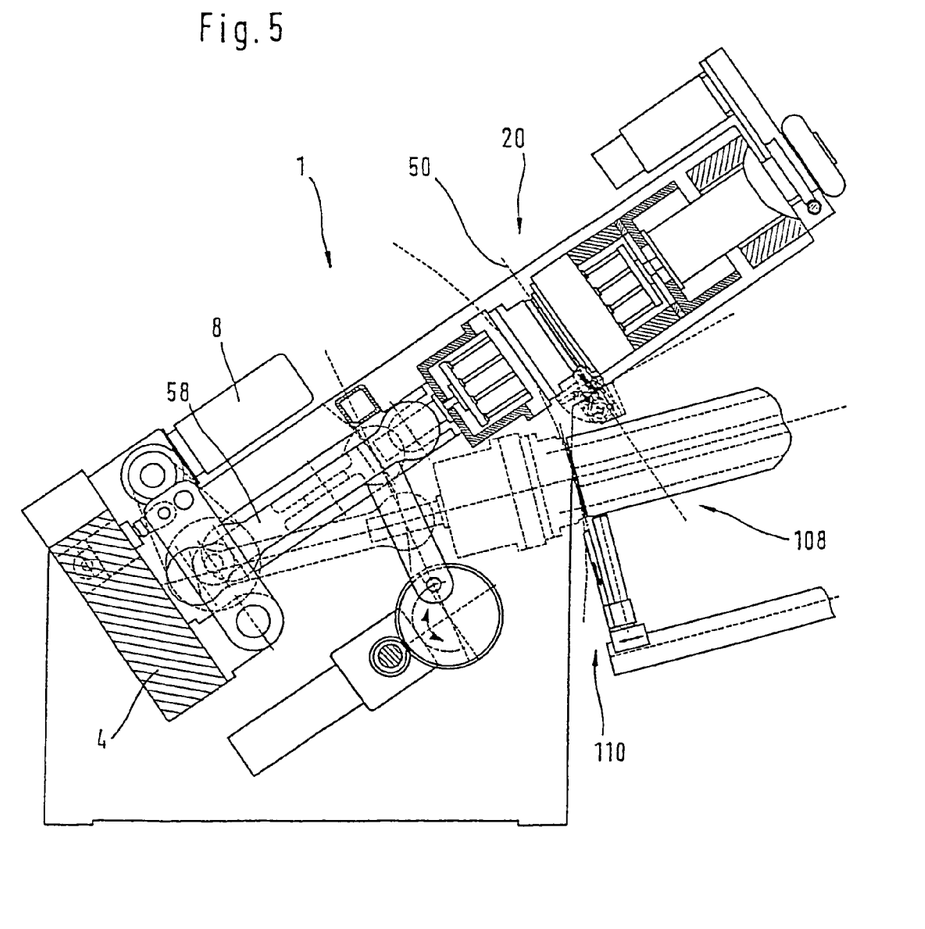
FIG. 5 represents the variant shown in FIGS. 1 through 4 in an obliquely positioned operational arrangement.

The pivoted levers 38 for rotatably accommodating the lower tool table 32, which were already represented in FIGS. 1 and 2, include in the presently represented variant, e.g., the pivoted lever lateral guides 66 having the form of cam rollers as represented in FIG. 3. The lateral guide members 66 of the pivoted levers 38 having, e.g., the form of cam rollers, run on hardened rails (not shown) and may be adjusted free from play for accurately guiding the lower tool 34.

As a drive mechanism for rotating the rotatable guide rails 38 of the rotatable guide rail assembly 40, one driving rod 68 each is provided on either side of the lower tool table 32.

As a drive mechanism 70 for generating the rotating movement of the lower tool 34 via the rotatable guide rails 38, it is possible to provide a driving rod pivotal drive mechanism 68 acting on both guide rails 38 which may be driven, e.g., by a geared servomotor 72 and a synchronized shaft 74. These details are represented more closely in FIG. 4 which shows a sectional view along line X-X of FIG. 3.

In order to limit the rotating movement into the frame, or into the stand 2, a pivoted lever stop 76 in accordance with the representation of FIG. 3 is provided. This stop 76 for the pivoted lever 38 may be adjusted for accurately positioning the lower tool 32.

The drive mechanism 84 for adjusting the upper tool table 28, which may, e.g., have the form of a precision drive, serves not only for adjusting the die-cutting stroke, for example, but may also be employed for activation or deactivation of the die-cutting stroke. Two threaded spindles 78 barely visible in FIGS. 1 and 2 are driven, e.g., through worm gears 80 via a synchronized shaft 82 through the intermediary of a geared motor 84.

In the presently represented variant in accordance with FIGS. 1 to 5, two backlash compensations 54 exemplarily having the form of pneumatic bellows cylinders are capable of drawing the upper tool table 28 upwardly through the intermediary of drawbars (not shown) so as to compensate for backlash between spindle and nut.

As is represented more closely in FIG. 2, a pre-stretch unit 86 is provided. The presently represented variant of the pre-stretch unit 86 includes, i.a., a pre-stretch means drive mechanism 88 having the form of a servomotor, which is coupled to the pre-stretch means plate 90 and the pre-stretch means 92 arranged thereon via a toothed belt drive not shown in FIG. 2 and a planetary roller threaded drive and the nut thereof through releasable connections. This pre-stretch means drive mechanism may also include a highly dynamic servomotor 88.

In the variant of the pre-stretch means drive mechanism of the pre-stretch unit 86 shown more closely in FIG. 1, the latter may include a console 94 supporting a hydraulic cylinder 96 as the pre-stretch means drive mechanism. The hydraulic cylinder 96 is linearly displaced with the console 94 together with the upper tool table 28 while stationary relative to the latter. The distance between the hydraulic cylinder 96 and the upper tool table 28 thus remains permanently constant. The hydraulic cylinder 96 is encapsulated by a housing 98, so that hydraulic oil cannot spill even in the event of minor leakages. A thrust bar 100 is linked to the hydraulic cylinder 96 in accordance with the representation in FIG. 1, and in the presently represented variant its one end facing away from the hydraulic cylinder 96 is linked to the right end of a rocking lever 102. The rocking lever 102 is pivoted through the intermediary of a bearing mount 104. The bearing mount 104 in turn attacks at the upper tool table 28 via a suitable bracket. At the left end of the rocking lever 102, the pre-stretch means rod 106 is linked which is connected with the pre-stretch means plate 90 and the pre-stretch means 92 attached to the latter. The hydraulic cylinder 96 for driving the pre-stretch means 92 may include a servo control containing a programmable control for the stroke of the cylinder 96. The necessary hydraulic unit may be positioned inside the bottom part of the machine. The pre-stretch means rod 106 may be connected with the pre-stretch means plate 90 in the upper tool 30 via a compensating coupling. The housing 98 for the hydraulic cylinder 96 not only serves for entrapping any leakages, but may also support the servo control and moreover contain sensors or the like in order to report any occurring leakages, and may be provided with means for discharging such leakages. The same also applies to the hydraulic conduits.

In accordance with the representation of FIG. 2, the thermoforming apparatus 1 of the invention may be associated with a stacking means 108 for receiving, stacking and transporting the completed shaped bodies following ejection from the cavities of the lower tool 34. For this purpose, the stacking means 108 may include, e.g., a catcher 110 for transporting off the ejected shaped bodies.

For convenience of description, the reference symbols used in the above discussion of FIGS. 1 through 5 shall be used analogously in the following discussion of FIGS. 6 through 11 for components having an identical or similar action.

Figure 6:
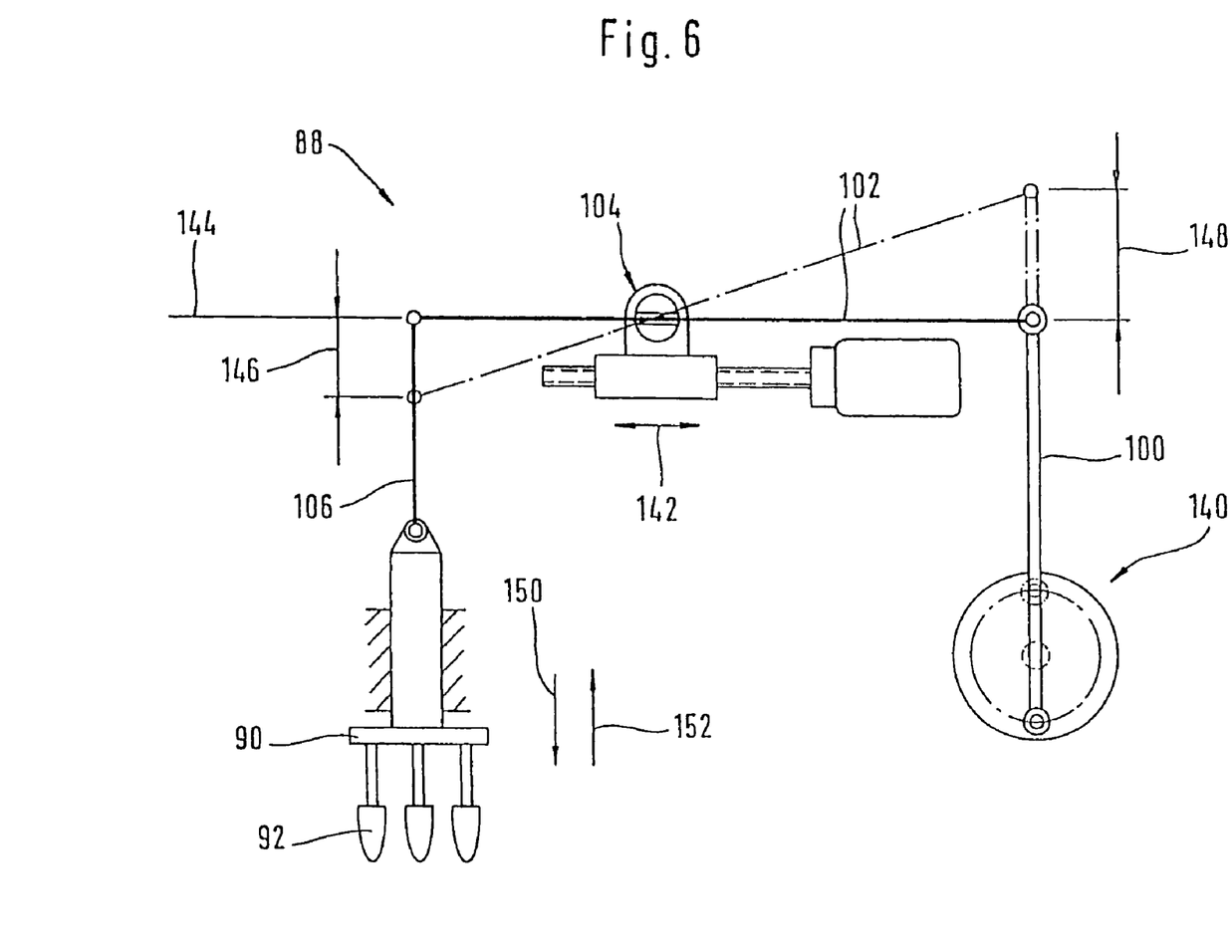
FIG. 6 is a schematically simplified drawing of an exemplary embodiment of a drive mechanism in accordance with the invention for actuating the pre-stretch means in the thermoforming apparatus of the invention in accordance with FIG. 1 through 5.
Figure 7:
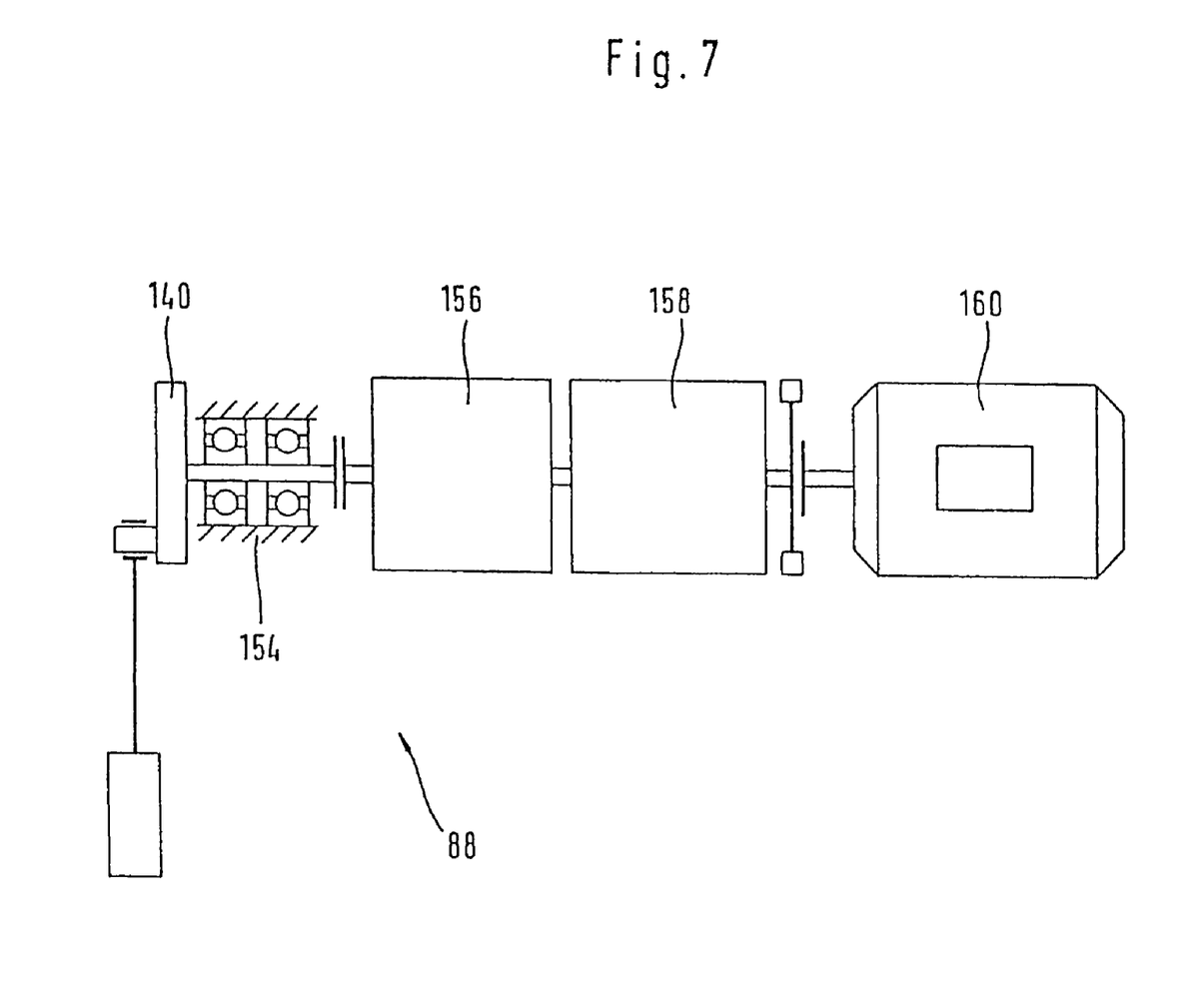
FIG. 7 is a schematically simplified drawing of an exemplary embodiment visualizing a possible design of the drive mechanism shown in FIG. 6.

FIG. 6 shows another variant of the pre-stretch means drive mechanisms 88 already discussed in FIGS. 1 through 5. A crank drive mechanism 140 acts via a thrust/draw rod 100 on a rocking lever 102 in a simplified dash-dotted representation in FIG. 6 in order to visualize two different positions, namely, the one position while performing the work stroke, i.e., lowering the pre-stretch means 92, and the return stroke, i.e., raising the pre-stretch means 92 positioned by the pre-stretch means plate 90. The rocking lever 102 pivoting about a fulcrum in the bearing mount 104—which in the presently represented variant is adapted to be displaced in a transverse direction as indicated by the arrow 142—acts on the pre-stretch means rod 106 linked to the pre-stretch means plate 90. Owing to the shift 142 of the bearing fulcrum 104 transversely to an imaginary horizontal line 144, it is advantageously possible to vary the stroke 146 and in contrast keep the stroke 148 of the pre-stretch means drive mechanism constant. The downwardly directed work stroke of the pre-stretch means 92 is here designated by the further arrow 150, and the respective return stroke by the arrow 152.

FIG. 7, again in a schematically simplified manner, represents in a drawing one possible embodiment of a pre-stretch means drive mechanism 88 on the drive side. The crank drive mechanism 140 is supported on the housing side through the intermediary of a bearing 154. A transmission 156 and a combined clutch/brake 158 connect the crank drive mechanism 140 to a motor 160.

Figure 8:
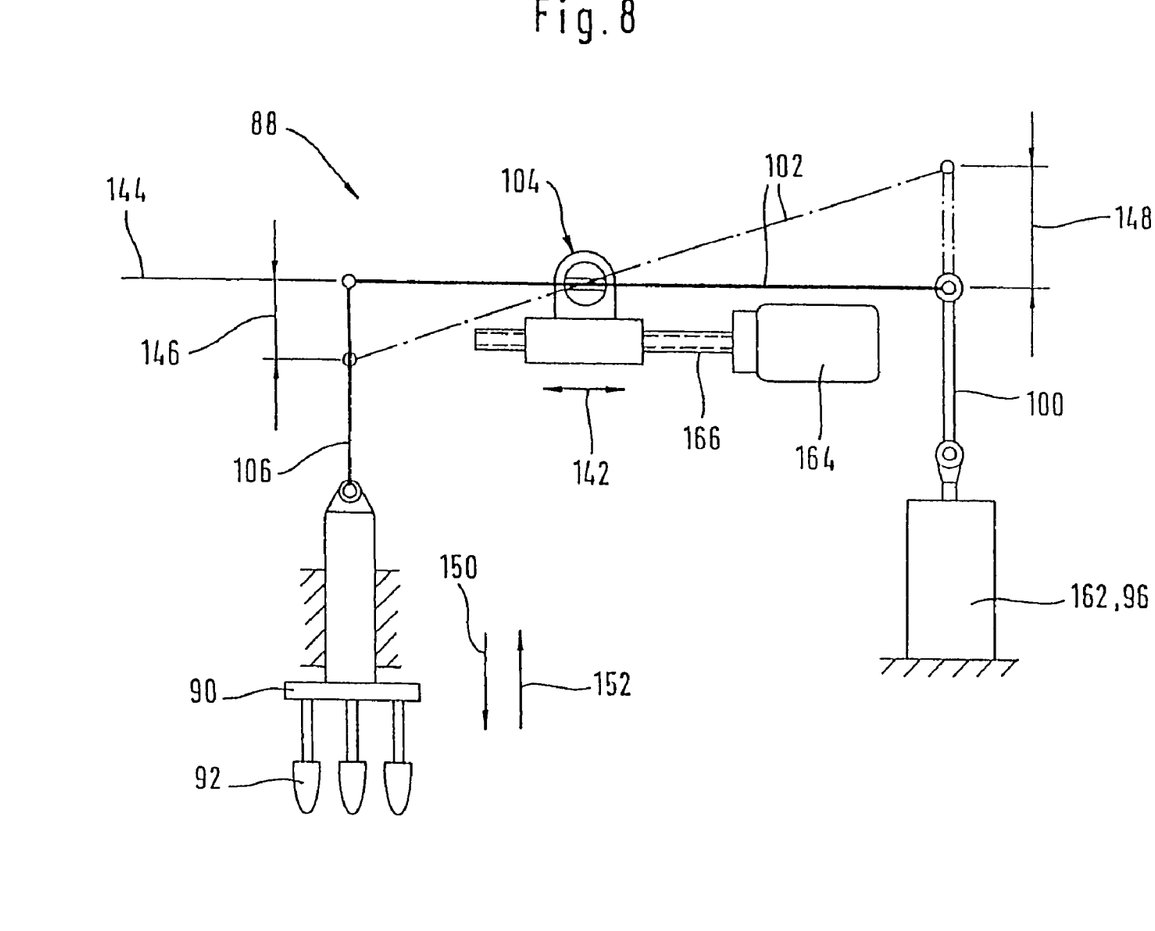
FIG. 8 shows an alternative embodiment of the pre-stretch means drive mechanism in accordance with the invention of the thermoforming apparatus of FIGS. 1 through 5.

FIG. 8 represents another alternative embodiment of a pre-stretch means drive mechanism 88 in schematically simplified drawing. The structure in terms of transmission substantially resembles the one discussed in FIG. 6. Instead of the crank drive mechanism 140 shown in FIG. 6, a hydraulic cylinder 162 is provided in FIG. 8, as is also the case, e.g., with the hydraulic pre-stretch cylinder 96 discussed in FIGS. 1 through 5. The shift of the fulcrum is again symbolized by the arrow 142. For shifting the fulcrum 104, an electric motor 164 and an actuating spindle 166 are provided in this drawing in accordance with FIG. 8.

Figure 9:
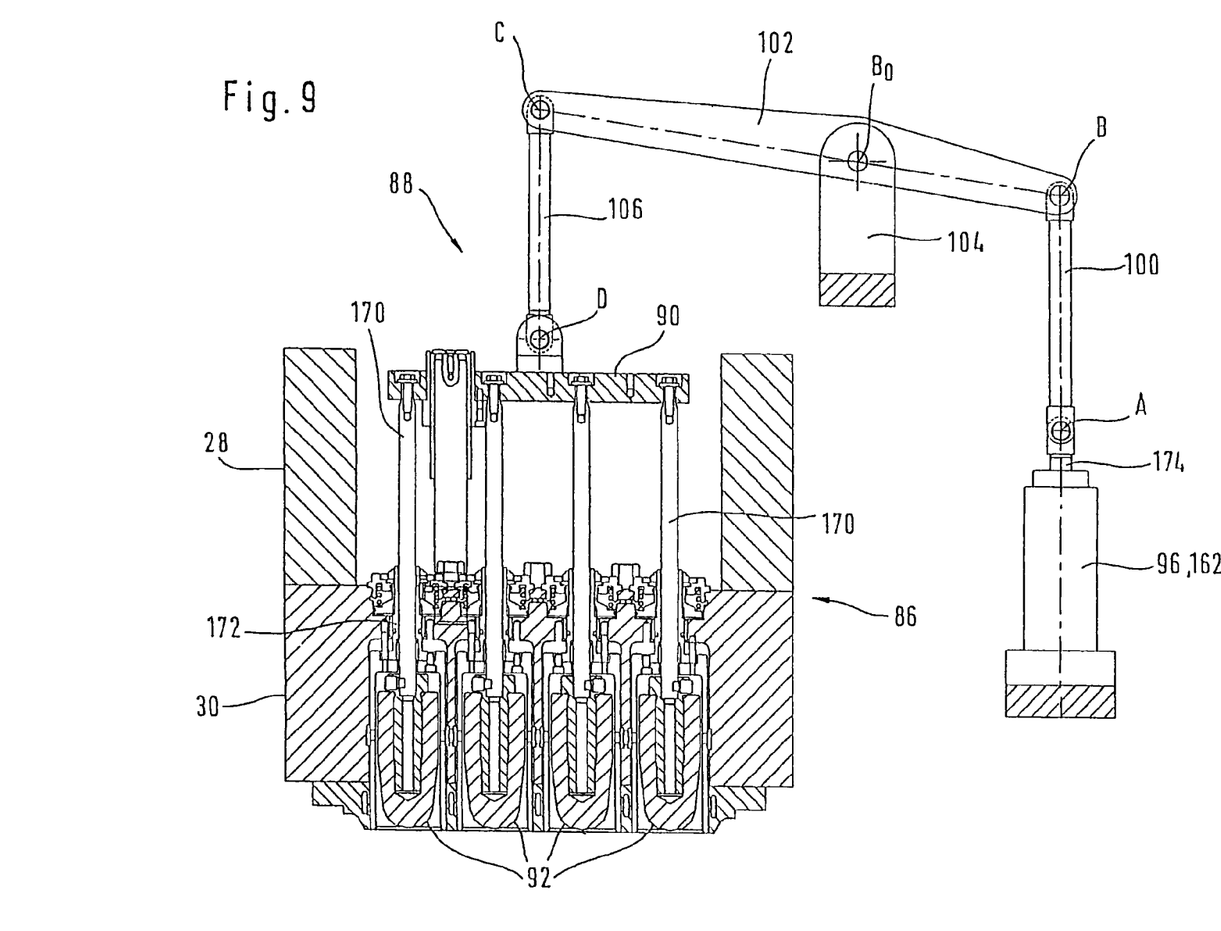
FIG. 9 represents another variant of the alternatives of pre-stretch means drive mechanisms as shown in FIG. 6 through 8, with the pre-stretch means in the home position.
Figure 10:
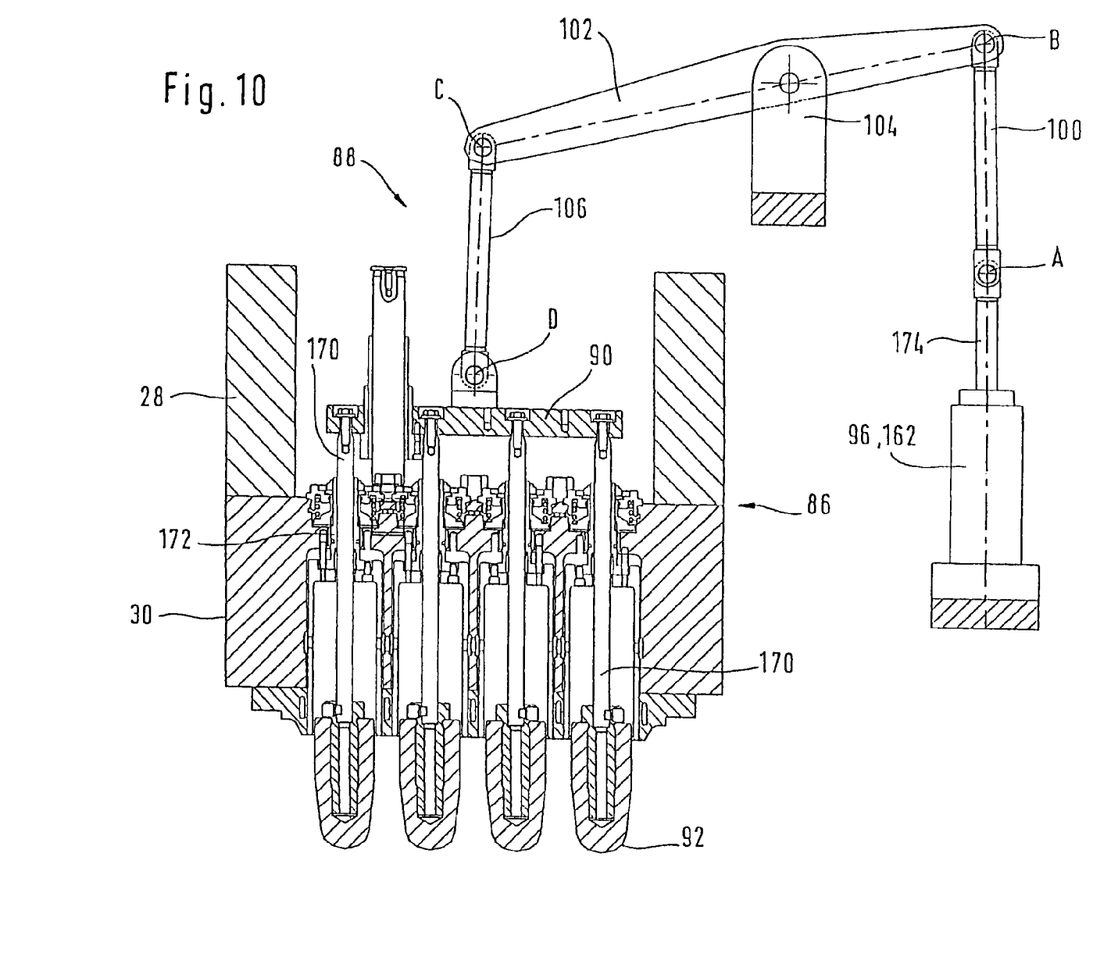
FIG. 10 represents the embodiment of a pre-stretch means drive mechanism as shown in FIG. 9, with the pre-stretch means in the extended condition.

FIG. 9 schematically represents another variant of a pre-stretch means drive mechanism 88. Generation of force is again effected by a hydraulic pre-stretch cylinder 96 or 162. The latter is connected with the thrust/draw rod 100 in point A. The thrust/draw rod 100 in turn is linked to the rocking lever 102 in point B. The rocking lever 102 is linked to the pre-stretch means rod 106 in point C. The pre-stretch means rod 106 is articulatedly connected with the pre-stretch means plate 90 in point D. Linked to the pre-stretch means plate 90 are the pre-stretch means 92 which, in turn, are mounted in the upper tool 30 in a linearly displaceable manner. The upper tool 30 is attached to the upper tool table 28. The rocking lever 102 is mounted in bearing 104 so as to rotate about point $B_0$.

In the case of the pre-stretch means drive mechanism 88 shown in FIG. 9, the hydraulic cylinders 96 and 162 are arranged before and behind the upper tool 30, respectively. An alternative arrangement of the cylinders 96 and 162 beside the tool 30 is equally possible. The pre-stretch means 92 are shown in the home position in FIG. 9. Correspondingly, the pre-stretch means 92 are shown in the extended position in the schematic drawing in accordance with FIG. 10. For the rest, the representation in accordance with FIG. 10 resembles the variant of an exemplary embodiment of a pre-stretch means drive mechanism 88 as shown in FIG. 9.

Figure 11:
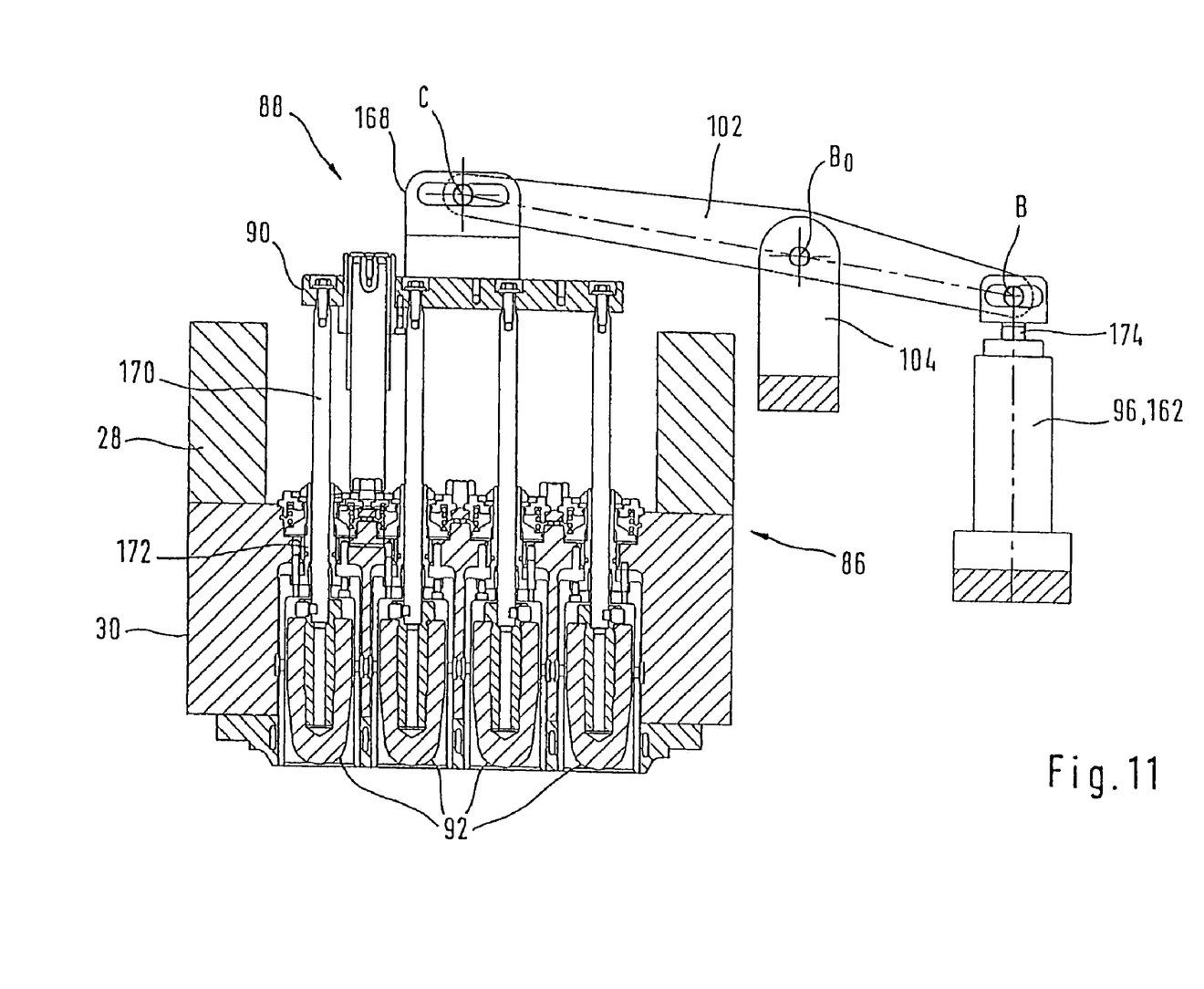
FIG. 11 shows another alternative transmission structure for the variants of pre-stretch means drive mechanisms as shown in FIGS. 6 through 10.

FIG. 11 shows another alternative embodiment of a pre-stretch means drive mechanism 88. It is similar to the variant shown in FIGS. 9 and 10, however includes an alternative lever mechanism. Here the linking points B and C include longitudinal holes allowing for axial displacement of these linking points, so that the hydraulic cylinder 96 or 162 may be linked directly to rocking lever 102 in point B, so that it is possible to omit thrust/draw rod 100. It is equally possible to omit the pre-stretch means rod 106 inasmuch as the previous linking points C and D coincide in the common linking point C, at which the rocking lever 102 is directly connected through a correspondingly designed shoulder or bearing mount 168 with the pre-stretch means plate 90.

As was already discussed in the foregoing, in order to form the shaped bodies having, e.g., a cup shape, the heated plastic sheet 50 is pressed into the mold depressions or cavities of the lower tool 34 with the aid of the pre-stretch means 92 mounted in the upper tool 30 for rectilinear displacement. By generating a pressure above atmospheric in the upper tool 30, for instance, the sheet applies against the walls of the mold depressions or cavities. The pre-stretch means 92 are again returned into their home position (cf. FIG. 9) in the upper tool 30 (cf. arrows 150 and 152 in FIGS. 6 and 8).

In order to achieve minimum times for forming the shaped bodies, a highly dynamic pre-stretch means drive mechanism 88 is being proposed. For one moving cycle of the pre-stretch means 92 (lowering movement 150 and return movement 153 into the starting position) a period of 300 ms at the most, preferably 250 ms at the most, and in a particularly preferred manner 200 ms at the most is attained. Moreover the pre-stretch means drive mechanism 88 discussed in FIGS. 6 through 11 is capable of generating the forces necessary for pre-stretching the plastic sheet 50. The sum of the forces acting on the single pre-stretch means 92 may—depending on the embodiment—amount to as much as 50,000 N.

Accordingly, the above discussed embodiment of a pre-stretch means drive mechanism 88 is provided which includes a hydraulic cylinder 96 or 162 for generating the necessary forces. In the representations in accordance with FIGS. 9 through 11, the pre-stretch means 92 are fixedly connected with a bridge, or the so-called pre-stretch means plate 90, respectively, through the intermediary of a pre-stretch means plunger rod 170. The plunger rods 190 move rectilinearly while guided in guide bushes 172 of the upper tool 30, so that the entire pre-stretch unit 86 may be moved vertically.

Driving the pre-stretch means 92 is performed, in accordance with the above discussion, with the aid of the hydraulic cylinder 96 or 162—as represented in FIGS. 1 through 5—fixedly connected with a console 94 which in turn is supported by the upper tool table 28. The linear movement of the piston rod 174 is initially transmitted to the rocking lever 102 by the coupling or thrust/draw rod 100 including the rotary joints A and B. The rocking lever 102 is—in accordance with the foregoing discussion—rotatably supported in point $B_0$ relative to the upper tool table 28. The coupling or pre-stretch means rod 106 including the rotary joints C and D finally transmits the movement of the rocking lever 102 to the pre-stretch unit 86.

The transmission 88 schematically represented in FIGS. 6 through 11 may be varied in many different forms. In one exemplary variant, the movement of the rocking lever 102 may be transmitted to the pre-stretch unit 86 by a pin and a guide track. Moreover the cylinder 96 or 162 may, as an alternative for the fixed connection with the console 94, merely be linked relative to the console 94 and thus be kept rotatable.

One more advantage of the hydraulic pre-stretch means drive mechanism 88 are the high forces thereby achievable at very good dynamics. The risk of thermal overload does not exist.

The present invention thus for the first time advantageously furnishes a thermoforming apparatus for producing shaped bodies of plastic sheet, such as cups, containers, lids, secondary packagings for foodstuffs or the like, comprising a forming station with a two-part forming tool. The two-part forming tool comprises an upper tool table adapted to be adjustably fixed and having an upper tool with pre-stretch means movably mounted therein, and a movable lower tool table having a lower tool with cavities. The movable lower tool table is guided through the intermediary of guide means and capable of being approached to the upper tool table and moved away from it by drive means. In accordance with the invention, the upper tool table for the first time includes associated drive means for adjusting the upper tool table in its position relative to the upper dead center of the lower tool table in correspondence with the respective shaped bodies to be produced. Furthermore the upper tool table for the first time includes associated second drive means for driving the pre-stretch means movably mounted in the upper tool. Furthermore the present invention for the first time proposes an economical method for producing the shaped bodies of plastic sheet.

Where a hydraulic drive mechanism is provided for the pre-stretch means, it may advantageously be provided in the form of a so-called linear amplifier servo control, so that both its stroke and velocity profile may be controlled and thus predetermined independently of each other.

With the thermoforming apparatus in accordance with the invention it is possible to process plastic sheets of PP, PS, PE, PET, ABS or PVC. The plastic sheet supplied to the thermoforming apparatus as a sheet web may have a sheet web width of at least 250 mm to 750 mm, at a sheet web thickness of at least 0.3 mm to 4 mm. The available forming area between the upper and lower tools is at least 700 mm×450 mm. The maximum clamping force is at least 400 kN at a maximum cutting length of at least 8400 mm.

LIST OF REFERENCE SYMBOLS

1 thermoforming apparatus
2 mount or frame
4 lower cross-member
6 crankshaft drive mechanism
8 electric servomotor
10 belt
12 pulley
14 pulley
17 lever arm
18 bracket
20 two-part forming tool
22
24 upper cross-member
26 upper tool drive mechanism adjustment
28 upper tool table
30 upper tool
32 lower tool table
34 lower tool
36 lower tool table linear guide means
38 rotatable guide rails
41 guide rail assembly
42 guide means
44 ejector drive means
46 connecting rod bearing
48 chain transport means
50 plastic sheet
52 upper tool table linear guide means
54 backlash compensation
56 ejector
58 connecting rod
60 first connecting rod portion
62 eccentric shaft portion
64 die-cutting drive mechanism
66 pivoted lever lateral guides
68 driving pivotal drive mechanism
70 rotational drive mechanism
72 geared servomotor
74 synchronized shaft
76 pivoted lever stop
78 threaded spindle
80 worm gear
82 synchronized shaft
84 geared motor
86 pre-stretch unit
88 pre-stretch means drive mechanism
90 pre-stretch means plate
92 pre-stretch means
94 console for pre-stretch means drive mechanism
96 hydraulic pre-stretch cylinder
98 housing
100 thrust bar
102 rocking lever
104 bearing mount rocking lever
106 pre-stretch means rod
108 stacking means
110 catcher
140 crank drive mechanism
142 fulcrum shift
144 imaginary horizontal line
146 variable stroke
148 constant stroke
150 work stroke
152 return stroke
154 bearing
156 transmission
158 combined clutch/brake
160 motor
162 hydraulic cylinder
164 electric motor
166 actuating spindle
168 shoulder or bearing mount
170 pre-stretch means plunger rod 172 guide track
174 piston rod

The invention claimed is:

1. A thermoforming apparatus for producing shaped bodies of plastic sheet, such as cups, containers, lids, secondary packagings for foodstuffs or the like, comprising
a forming station with a two-part forming tool,
wherein said two-part forming tool comprises an upper tool table adapted to be adjustably fixed and having an upper tool with pre-stretch means movably mounted therein, and a movable lower tool table having a lower tool with cavities,
wherein said movable lower tool table is guided through the intermediary of guide means and capable of being approached to said upper tool table and moved away from it by drive means, and
wherein said upper tool table includes associated first drive means for adjusting said upper tool table in its position relative to the upper dead center of said lower tool table in correspondence with the respective shaped body to be produced, and
said upper tool table includes associated second drive means for driving said stretch means movably mounted in said upper tool,
wherein said first drive means of said lower tool table is a crank drive,
wherein said lower tool table together with its first drive means is liftable, within said guide means linearly guiding said lower tool table, through the intermediary of a second drive means, such that a predetermined stroke could be achieved, for performing a die-cutting movement, and
wherein the pre-stretch means are driveable, through the intermediary of said second drive means of said lower tool table, such that a stroke of at least 120 mm may be performed in less than 300 ms.

2. The thermoforming apparatus in accordance with claim 1, wherein said first drive means for adjusting said upper tool table have the form of an electrical servomotor.

3. The thermoforming apparatus in accordance with claim 1, wherein said first drive means cooperate via a synchronization shaft with a drive mechanism consisting of worm gears or gears arranged thereon with two actuating spindles which, in turn, act on said upper tool table such that the latter may be moved up and down in its horizontal orientation, so that said upper tool table may be adjusted to the respective shaped body to be produced.

4. Method for producing shaped bodies of plastic sheet, such as cups, containers, lids, secondary packagings for foodstuffs or the like, with the aid of a thermoforming apparatus for producing shaped bodies of plastic sheet, such as cups, containers, lids, secondary packagings for foodstuffs or the like, comprising
a forming station with a two-part forming tool,
wherein said two-part forming tool comprises an upper tool table adapted to be adjustably fixed and having an upper tool with pre-stretch means movably mounted therein, and a movable lower tool table having a lower tool with cavities, and
wherein said movable lower tool table is guided through the intermediary of guide means and capable of being approached to said upper tool table and moved away from it by drive means,
which method comprises the following steps:
supplying plastic sheet;
stretching said plastic sheet;
closing said forming tool by guiding said movable lower tool table through the intermediary of said guide means and driving it through the intermediary of said drive means such that it is approached towards said upper tool table;
driving said lower tool table through the intermediary of the drive means operating as a crank drive
producing the shaped bodies in the closed condition of said forming tool, wherein said pre-stretch means movably mounted in said upper tool may be driven through the intermediary of second drive means, and said lower tool table together with its first drive means is lifted and lowered, within said guide means linearly guiding said lower tool table, through the intermediary of a second drive means, such that a predetermined stroke could be achieved, for performing a die-cutting movement;
opening said forming tool by guiding said movable lower tool table through the intermediary of said guide means and driving it through the intermediary of said first drive means such that it is moved away from said upper tool table;
ejecting the shaped bodies, optionally into a stacking means, wherein said upper tool table is adjusted through the intermediary of associated first drive means in its position relative to the upper dead center of said lower tool table in correspondence with the respective shaped body to be produced.

5. The thermoforming apparatus in accordance with claim 1, wherein said pre-stretch means may be driven through the intermediary of said second drive means such that a stroke of at least 120 mm may be performed in less than 200 ms.

6. The thermoforming apparatus in accordance with claim 1, wherein said second drive means of said upper tool table for driving said stretch means includes a crank drive driven through the intermediary of an electrical servomotor.

7. The thermoforming apparatus in accordance with claim 1, wherein said second drive means act on said pre-stretch means in said upper tool via a thrust/draw rod, a rocking lever, and a forcing lever.

8. The thermoforming apparatus in accordance with claim 1, wherein said second drive means act on said pre-stretch means in said upper tool via a thrust/draw rod, a rocking lever, and a forcing lever through the intermediary of a shiftably designed fulcrum B0 of said rocking lever.

9. The thermoforming apparatus in accordance with claim 1, wherein said second drive means of said upper tool table include a hydraulic drive mechanism for driving said pre-stretch means.

10. The method in accordance with claim 4, wherein the pre-stretch means moveably mounted in said upper tool table is driven, through the intermediary of said second drive means of said lower tool table, such that a stroke of at least 120 mm may be performed in less than 300 ms.

11. The method in accordance with claim 4, wherein the pre-stretch means moveably mounted in said upper tool table is driven, through the intermediary of said second drive means of said lower tool table, such that a stroke of at least 120 mm may be performed in less than 200 ms.

* * * * *